US012580905B2

(12) United States Patent
Chirala et al.

(10) Patent No.: US 12,580,905 B2
(45) Date of Patent: Mar. 17, 2026

(54) METHODS, SYSTEMS, AND COMPUTER READABLE MEDIA FOR AUTOMATICALLY BINDING A SERVICE-BASED INTERFACE (SBI) COMMUNICATIONS DIGITAL CERTIFICATE LIFECYCLE TO A NETWORK FUNCTION (NF) LIFECYCLE

(71) Applicant: Oracle International Corporation, Redwood Shores, CA (US)

(72) Inventors: Pavani Chirala, Sadananda Nagar (IN); Jay Rajput, Bangalore (IN); Virendra Singh, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 153 days.

(21) Appl. No.: 18/207,117

(22) Filed: Jun. 7, 2023

(65) Prior Publication Data

US 2024/0414144 A1      Dec. 12, 2024

(51) Int. Cl.
*H04L 9/40* (2022.01)

(52) U.S. Cl.
CPC ................................. *H04L 63/0807* (2013.01)

(58) Field of Classification Search
CPC .................................................... H04L 63/0807
See application file for complete search history.

(56) References Cited

U.S. PATENT DOCUMENTS

| | | | |
|---|---|---|---|
| 9,331,990 B2 * | 5/2016 | Le Saint | .......... G06Q 20/38215 |
| 10,075,435 B1 * | 9/2018 | Byrd | ................... H04L 63/0853 |

(Continued)

FOREIGN PATENT DOCUMENTS

| | | |
|---|---|---|
| WO | WO-2021/008716 A1 | 1/2021 |
| WO | WO 2021/099675 A1 | 5/2021 |

(Continued)

OTHER PUBLICATIONS

Commonly-Assigned, co-pending U.S. Appl. No. 18/113,041 for "Methods, Systems, and Computer Readable Media for Protecting Against Unauthorized Use of Certificate Management Protocol (CMP) Client Identity Private Keys and Public Key Certificates Associated With Network Functions" (Unpublished, filed Feb. 22, 2023).

(Continued)

*Primary Examiner* — Yonas A Bayou
(74) *Attorney, Agent, or Firm* — Jenkins, Taylor & Hunt, P.A.

(57) ABSTRACT

A method for automatically binding an SBI communications digital certificate lifecycle to an NF lifecycle includes receiving, at an NRF, an NF deregister request message for deregistering an NF. The method further includes generating, by the NRF and in response to the NF deregister request message or successful completion of deregistration of the NF, a certificate revocation request message for revoking at least one digital certificate used by NF for SBI communications. The method further includes transmitting, by the NRF, the certificate revocation request message to a certificate authority. The method further includes receiving, by the NRF, an NF register request message identifying the NF. The method further includes determining, by the NRF, that the at least one digital certificate of the NF has been revoked. The method further includes, in response to determining that the at least one digital certificate of the NF has been revoked, performing, by the NRF, a network security action in response to the NF register request message.

18 Claims, 7 Drawing Sheets

(56) References Cited

U.S. PATENT DOCUMENTS

| 10,903,999 | B1 * | 1/2021 | Raman | H04L 9/083 |
|---|---|---|---|---|
| 11,522,721 | B2 | 12/2022 | Choyi et al. | |
| 12,519,660 | B2 | 1/2026 | Rajput et al. | |
| 2021/0288802 | A1 | 9/2021 | Muhanna et al. | |
| 2021/0314171 | A1 | 10/2021 | Choyi et al. | |
| 2021/0377053 | A1 | 12/2021 | Mahajan et al. | |
| 2021/0377054 | A1 | 12/2021 | Mahajan et al. | |
| 2022/0086734 | A1 * | 3/2022 | Aggarwal | H04L 63/0884 |
| 2022/0210624 | A1 * | 6/2022 | Ping | H04W 24/04 |
| 2022/0345486 | A1 * | 10/2022 | Rajput | H04L 9/3239 |
| 2023/0064698 | A1 * | 3/2023 | Choyi | H04L 63/0823 |
| 2023/0412396 | A1 | 12/2023 | Bommisetty et al. | |
| 2024/0121111 | A1 | 4/2024 | Gomez et al. | |

FOREIGN PATENT DOCUMENTS

| WO | WO 2023/242058 A1 | 12/2023 |
|---|---|---|
| WO | WO 2024/094319 A1 | 5/2024 |
| WO | WO 2024/177790 A1 | 8/2024 |

OTHER PUBLICATIONS

Hardt, "The OAuth 2.0 Authorization Framework", Internet Engineering Task Force (IETF), RFC 6749, pp. 1-76 (Oct. 2012).

"3rd Generation Partnership Project; Technical Specification Group Services and System Aspects; Security architecture and procedures for 5G system (Release 17)", 3GPP TS 33.501, V17.8.0, pp. 1-292 (Dec. 2022).

"3rd Generation Partnership Project; Technical Specification Group Core Network and Terminals; 5G System; Principles and Guideline for Services Definition; Stage 3 (Release 18)", 3GPP TS 29.501, V18.0.0, pp. 1-83 (Dec. 2022).

"3rd Generation Partnership Project; Technical Specification Group Core Network and Terminals; 5G System; Technical Realization of Service Based Architecture; Stage 3 (Release 18)", 3GPP TS 29.500, V18.0.0, pp. 1-131 (Dec. 2022).

"3rd Generation Partnership Project; Technical Specification Group Services and System Aspects; Security architecture and procedures for 5G system (Release 17)", 3GPP TS 33.501, V17.7.0, pp. 1-292 (Sep. 2022).

"3rd Generation Partnership Project; Technical Specification Group Core Network and Terminals; 5G System; Principles and Guideline for Services Definition; Stage 3 (Release 17)", 3GPP TS 29.501, V17.7.0, pp. 1-81 (Sep. 2022).

"3rd Generation Partnership Project; Technical Specification Group Core Network and Terminals; 5G System; Technical Realization of Service Based Architecture; Stage 3 (Release 17)", 3GPP TS 29.500, V17.8.0, pp. 1-131 (Sep. 2022).

"3rd Generation Partnership Project; Technical Specification Group Services and System Aspects; Procedures for the 5G System (5GS); Stage 2 (Release 17)", 3GPP TS 23.502, V17.6.0, pp. 1-748 (Sep. 2022).

3rd Generation Partnership Project; Technical Specification Group Services and System Aspects; Security architecture and procedures for 5G system (5GS); Stage 2 (Release 17), 3GPP TS 23.501, V17.6.0, pp. 1-571 (Sep. 2022).

"3rd Generation Partnership Project; Technical Specification Group Core Network and Terminals; 5G System; Network Function Repository Services; Stage 3 (Release 17)", 3GPP TS 29.510, V17.5.0, pp. 1-298 (Mar. 2022).

Notification of Transmittal of the International Search Report and the Written Opinion of the International Searching Authority, or the Declaration for International Patent Application Serial No. PCT/US2024/013622 (May 3, 2024).

3rd Generation Partnership Project; Technical Specification Group Core Network and Terminals; 5G System; Network Function Repository Services; Stage 3 (Release 18) 3GPP TS 29.510 V18.1.0 (Dec. 2022).

3rd Generation Partnership Project; Technical Specification Group Services and System Aspects; Network Domain Security (NDS); Authentication Framework (AF) (Release 18) 3GPP TS 33.310 V18.0.0 (Mar. 2023).

Cooper, et al., "Internet X.509 Public Key Infrastructure Certificate and Certificate Revocation List (CRL) Profile", IETF RFC 5280 (May 2008).

Adams, et al., "Internet X.509 Public Key Infrastructure Certificate Management Protocol (CMP)", IETF RFC 4210 (Sep. 2005).

3rd Generation Partnership Project; Technical Specification Group Services and System Aspects; Security architecture and procedures for 5G system (Release 18) 3GPP TS 33.501 V18.0.0 (Dec. 2022).

Non-Final Office Action for U.S. Appl. No. 18/113,041, filed Mar. 13, 2025.

Notice of Allowance for U.S. Appl. No. 18/113,041 (Nov. 18, 2025).

Advisory Action for U.S. Appl. No. 18/113,041 (Oct. 6, 2025).

Final Office Action for U.S. Appl. No. 18/113,041 (Jul. 1, 2025).

Applicant-Initiated Interview Summary for U.S. Appl. No. 18/113,041 (Jun. 26, 2025).

* cited by examiner

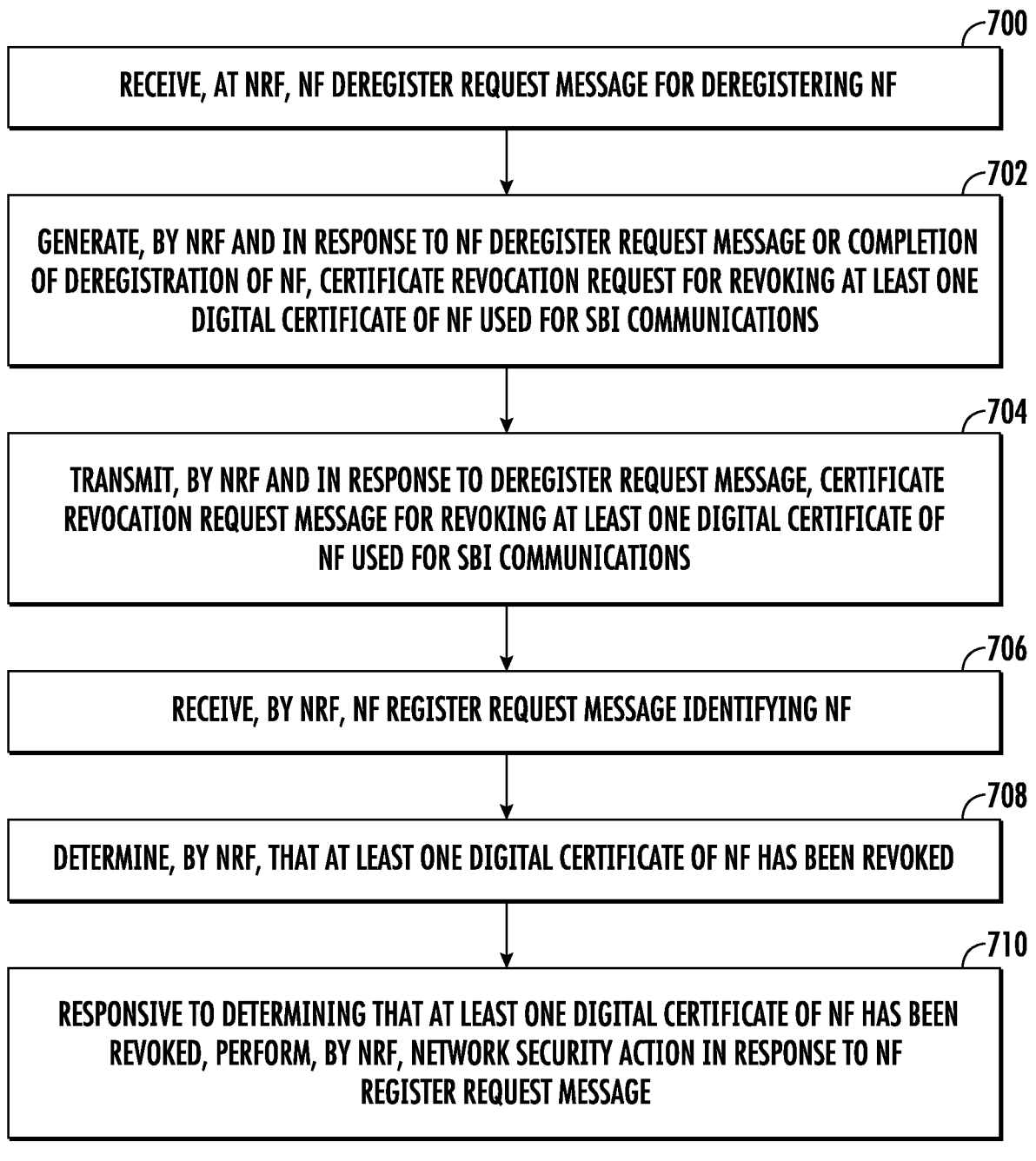

700

RECEIVE, AT NRF, NF DEREGISTER REQUEST MESSAGE FOR DEREGISTERING NF

702

GENERATE, BY NRF AND IN RESPONSE TO NF DEREGISTER REQUEST MESSAGE OR COMPLETION OF DEREGISTRATION OF NF, CERTIFICATE REVOCATION REQUEST FOR REVOKING AT LEAST ONE DIGITAL CERTIFICATE OF NF USED FOR SBI COMMUNICATIONS

704

TRANSMIT, BY NRF AND IN RESPONSE TO DEREGISTER REQUEST MESSAGE, CERTIFICATE REVOCATION REQUEST MESSAGE FOR REVOKING AT LEAST ONE DIGITAL CERTIFICATE OF NF USED FOR SBI COMMUNICATIONS

706

RECEIVE, BY NRF, NF REGISTER REQUEST MESSAGE IDENTIFYING NF

708

DETERMINE, BY NRF, THAT AT LEAST ONE DIGITAL CERTIFICATE OF NF HAS BEEN REVOKED

710

RESPONSIVE TO DETERMINING THAT AT LEAST ONE DIGITAL CERTIFICATE OF NF HAS BEEN REVOKED, PERFORM, BY NRF, NETWORK SECURITY ACTION IN RESPONSE TO NF REGISTER REQUEST MESSAGE

FIG. 7

METHODS, SYSTEMS, AND COMPUTER READABLE MEDIA FOR AUTOMATICALLY BINDING A SERVICE-BASED INTERFACE (SBI) COMMUNICATIONS DIGITAL CERTIFICATE LIFECYCLE TO A NETWORK FUNCTION (NF) LIFECYCLE

TECHNICAL FIELD

The subject matter described herein relates to managing encryption keys and certificates used to access resources in a core network, such as a 5G core network. More particularly, the subject matter described herein relates to methods, systems, and computer readable media for automatically binding an SBI communications digital certificate lifecycle to an NF lifecycle.

BACKGROUND

In 5G telecommunications networks, a network function that provides service is referred to as a producer NF or NF service producer. A network function that consumes services is referred to as a consumer NF or NF service consumer. A network function can be a producer NF, a consumer NF, or both, depending on whether the network function is consuming, producing, or consuming and producing services. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name (FQDN) that resolves to an IP address and port number on a network node that hosts a producer NF. An NF instance is an instance of a producer NF that provides a service. A given producer NF may include more than one NF instance. It should also be noted that multiple NF instances can share the same service endpoint.

NFs register with a network function repository function (NRF). The NRF maintains profiles of available NF instances identifying the services supported by each NF instance. The profile of an NF instance is referred to in 3GPP TS 29.510 as an NF profile. NF instances can obtain information about other NF instances that have registered with the NRF through the NF discovery service operation. According to the NF discovery service operation, a consumer NF sends an NF discovery request to the NRF. The NF discovery request includes query parameters that the NRF uses to locate the NF profiles of producer NFs capable of providing the service identified by the query parameters. NF profiles are data structures that define the type of service provided by an NF instance as well as contact and capacity information regarding the NF instance.

A service communication proxy (SCP) can also invoke the NF discovery service operation to learn about available producer NF instances. The case where the SCP uses the NF discovery service operation to obtain information about producer NF instances on behalf of consumer NFs is referred to as delegated discovery. Consumer NFs connect to the SCP, and the SCP load balances traffic among producer NF service instances that provide the required services or directly routes the traffic to the destination producer NF instances.

One problem that exists in 5G and other types of networks is the unauthorized use of digital certificates. The 5G service based interface (SBI) network relies on various NF certificates, such as transport layer security (TLS) certificates, OAuth 2.0 certificates, and client credentials assertion (CCA) certificates, to support security procedures for authentication and authorization, etc. The Third Generation Partnership Project (3GPP) does not define a method to bind the NF certificates (TLS/OAuth 2.0/CCA) with the lifecycle of an NF, which means that a certificate continues to be valid even when the NF is deregistered from the network. This could lead to an example attack where the hacker can make use of the deregistered NF's TLS key and certificate to mimic an NF, which hacks into the mutual authentication specified in 3GPP TS 33.501 section 13.3.1 to carry out a malicious attack in the network. In such an example attack (unauthorized access to subscriber data from a unified data management (UDM) function), a hacker can impersonate an NF, register itself with NRF, request an OAuth 2.0 access token, access the UDM subscriber data service-based architecture (SBA) interface, and then extract the subscriber data.

Accordingly, there exists a need for improved methods, systems, and computer readable media for binding digital certificate lifecycles with an NF's lifecycle.

SUMMARY

The subject matter described herein addresses the example attack and other similar attacks based on NF certificates by providing automating the linking of the lifecycle of NF certificates to the NF's lifecycle, i.e., by using bound 5G NF certificates. "Bound certificates," as used herein, refers to certificates whose lifecycles are bound to an NF's lifecycle and, as a result, are revoked automatically on deregistration of the NF. The subject matter described herein encompasses the NF invoking the deregistration procedure, followed by the NRF automatically initiating revocation procedure for all of the digital certificates (TLS/OAuth 2.0/CCA) issued to the deregistered NF. The NRF can leverage a certificate manager or other mechanism (manual configuration, etc.) to build the certificate list for the deregistered NF.

As used herein, the term "digital certificates used for SBI communications" refers to any digital certificate used by the NF to authenticate itself to other NFs in SBI communications. Such digital certificates include public key certificates, such as X.509 certificates.

A method for automatically binding a service-based interface (SBI) communications digital certificate lifecycle to an NF lifecycle includes receiving, at an NF repository function (NRF), an NF deregister request message for deregistering an NF. The method further includes generating, by the NRF and in response to the NF deregister request message or successful completion of deregistration of the NF, a certificate revocation request message for revoking at least one digital certificate used by NF for SBI communications. The method further includes transmitting, by the NRF, the certificate revocation request message to a certificate authority. The method further includes receiving, by the NRF, an NF register request message identifying the NF. The method further includes determining, by the NRF, that the at least one digital certificate of the NF has been revoked. The method further includes, in response to determining that the at least one digital certificate of the NF has been revoked, performing, by the NRF, a network security action in response to the NF register request message.

According to another aspect of the subject matter described herein, generating the certificate revocation request message includes generating a request message for revoking a digital certificate corresponding to an NF instance ID of the NF.

According to another aspect of the subject matter described herein, generating the certificate revocation request includes embedding the NF instance ID in the digital certificate and including the digital certificate in the certificate request message.

According to another aspect of the subject matter described herein, generating the certificate revocation request message includes generating a certificate management protocol (CMP) certificate revocation request message.

According to another aspect of the subject matter described herein, generating the certificate revocation request message includes generating the certificate revocation request message for revoking at least a transport layer security (TLS) certificate used by the NF for SBI communications.

According to another aspect of the subject matter described herein, generating the certificate revocation request message includes generating the certificate revocation request message for revoking at least an OAuth 2.0 certificate used by the NF for SBI communications.

According to another aspect of the subject matter described herein, generating the certificate revocation request message includes generating the certificate revocation request message for revoking at least a client credentials assertion (CCA) certificate used by the NF for SBI communications.

According to another aspect of the subject matter described herein, determining that the at least one digital certificate has been revoked includes querying, by the NRF, the certificate authority to determine the status of the at least one digital certificate.

According to another aspect of the subject matter described herein, performing the network security action includes rejecting the NF register request message.

According to another aspect of the subject matter described herein, the method includes receiving, by the certificate authority, the certificate revocation request message and revoking the at least one digital certificate of the NF.

According to another aspect of the subject matter described herein, a system for automatically binding an SBI communications digital certificate lifecycle to an NF lifecycle is provided. The system includes an NRF including at least one processor and a memory. The system further includes an NF register/deregister handler implemented by the at least one processor for receiving an NF deregister request message for deregistering an NF. The system further includes a certificate manager implemented by the at least one processor for generating, in response to the NF deregister request message or successful completion of deregistration of the NF, a certificate revocation request message for revoking at least one digital certificate used by NF for SBI communications and transmitting the certificate revocation request message to a certificate authority. The NF register/deregister handler is configured to receive an NF register request message identifying the NF. The certificate manager is configured to determine that the at least digital one certificate of the NF has been revoked. The NF register/deregister handler is configured to, in response to the determination that that the at least one digital certificate of the NF has been revoked, perform a network security action in response to the NF register request message.

According to another aspect of the subject matter described herein, the certificate revocation request message includes an NF instance ID of the NF for revoking a digital certificate corresponding to the NF instance ID of the NF.

According to another aspect of the subject matter described herein, the NF instance ID of the NF is embedded in the digital certificate, which is included in the certificate revocation request message.

According to another aspect of the subject matter described herein, the certificate revocation request message includes a certificate management protocol (CMP) certificate revocation request message.

According to another aspect of the subject matter described herein, the certificate revocation request message includes a request message for revoking at least a transport layer security (TLS) certificate used by the NF for SBI communications.

According to another aspect of the subject matter described herein, the certificate revocation request message includes a request message for revoking at least an OAuth 2.0 certificate used by the NF for SBI communications.

According to another aspect of the subject matter described herein, the certificate revocation request message includes a request message for revoking at least a client credentials assertion (CCA) certificate used by the NF for SBI communications.

According to another aspect of the subject matter described herein, in determining that the at least one digital certificate has been revoked, the certificate manager is configured to query the certificate authority to determine the status of the at least one digital certificate.

According to another aspect of the subject matter described herein, performing the network security action, the NF register/deregister handler is configured to the NF register request message.

According to another aspect of the subject matter described herein, a non-transitory computer readable medium having stored thereon executable instructions that when executed by a processor of a computer control the computer to perform steps is provided. The steps include receiving, at an NRF, an NF deregister request message for deregistering an NF. The steps further include generating, by the NRF and in response to the NF deregister request message or successful completion of deregistration of the NF, a certificate revocation request message for revoking at least one digital certificate used by NF for SBI communications. The steps further include transmitting, by the NRF, the certificate revocation request message to a certificate authority. The steps further include receiving, by the NRF, an NF register request message identifying the NF. The steps further include determining, by the NRF, that the at least one digital certificate of the NF has been revoked. The steps further include, in response to determining that the at least one digital certificate of the NF has been revoked, performing, by the NRF, a network security action in response to the NF register request message.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which:

FIG. 7 is a flow chart illustrating an exemplary process for automatically binding a certificate's lifecycle to an NF's lifecycle.

DETAILED DESCRIPTION

Figure 1:
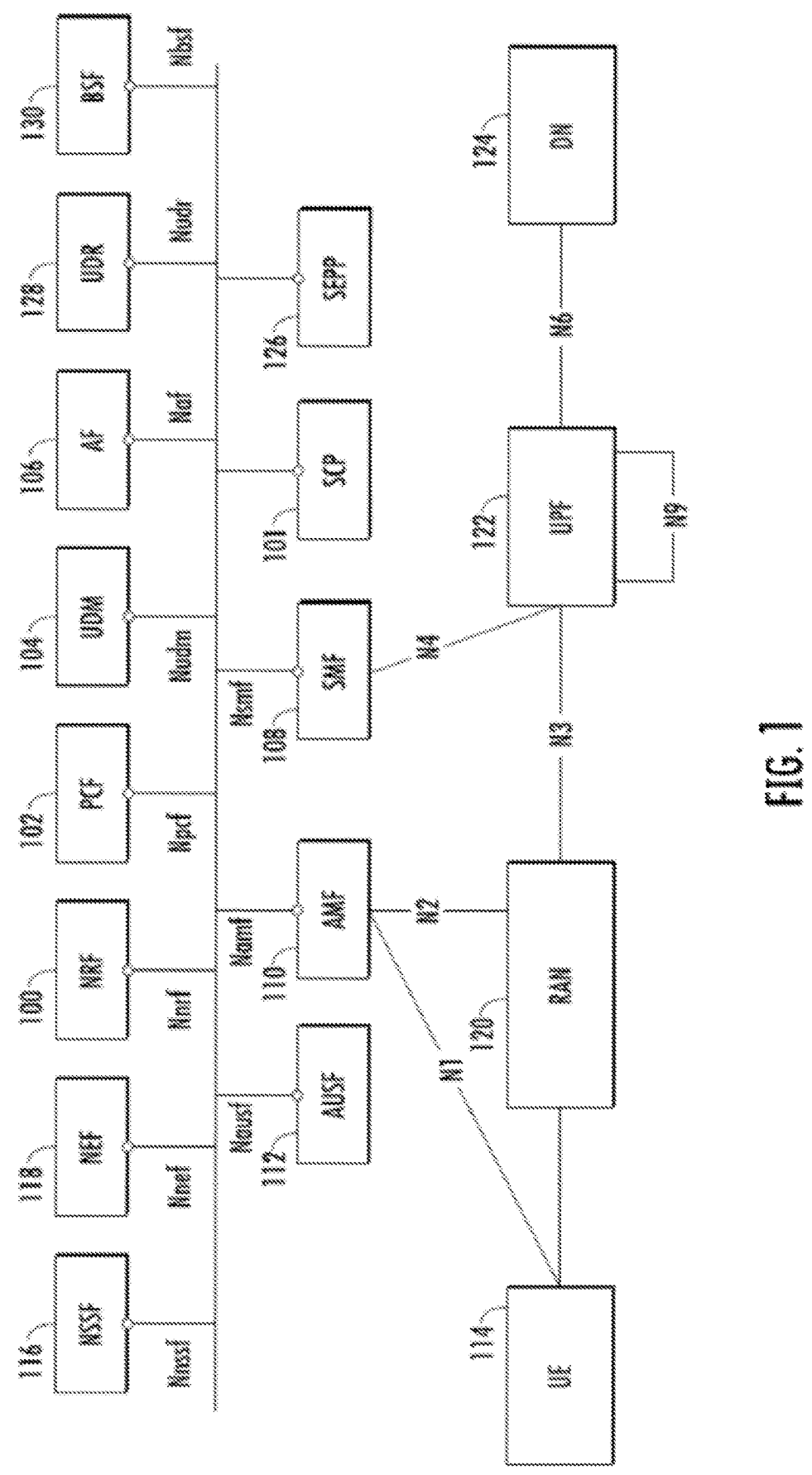
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available NF instances and their supported services and allow consumer NFs or SCPs to subscribe to and be notified of the registration of new/updated NF instances. SCP 101 may also support service discovery and selection of NF instances. SCP 101 may perform load balancing of connections between consumer and producer NFs.

NRF 100 is a repository for profiles of NF instances. To communicate with a producer NF instance, a consumer NF or an SCP must obtain the NF profile of the producer NF instance from NRF 100. The NF profile is a JavaScript object notation (JSON) data structure defined in 3GPP TS 29.510. The NF profile includes attributes that indicate the type of service provided, capacity of the NF instance, and information for contacting the NF instance.

In FIG. 1, any of the network functions can be consumer NFs, producer NFs, or both, depending on whether they are requesting, providing, or requesting and providing services. In the illustrated example, the NFs include a policy control function (PCF) 102 that performs policy related operations in a network, a unified data management function (UDM) 104 that manages user data, and an application function (AF) 106 that provides application services.

The NFs illustrated in FIG. 1 further include a session management function (SMF) 108 that manages sessions between an access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. NSSF 116 provides the NSSelection service, which allows NFs to request information about network slices and the NSSAIReachability service, which enables NFs to update and subscribe to receive notification of updates in network slice selection assistance information (NSSAI) reachability information.

A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a gNB (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN. A unified data repository (UDR) 128 stores subscription data for UEs. A binding support function (BSF) 130 manages bindings between PDU sessions and PCFs.

3GPP standards define some security protection for SBI communications. For example, 3GPP TS 33.501, section 13.3.1 specifies the usage of mutual authenticated TLS and secure hypertext transfer protocol (HTTPS) and further using identities embedded in the end entity certificates for authentication and policy checks. One point to highlight is that a hacker having access to a deregistered NF's TLS encryption key and certificate can use this to identify the hacker as a 5G NF to the NRF and other NFs.

3GPP standards do not bind the life cycle of the certificates to the NFs. This means that the hacker has the opportunity to obtain a security key of a deregistered NF and certificate and register with the NRF using the same NF instance ID as the deregistered NF.

Transport layer security/public key infrastructure (TLS/PKI) provides the concept of revocation using a certificate revocation list (CRL) or online certificate status protocol (OCSP) for a certificate stolen with the owner's knowledge. However, even with CRL and OCSP, the owner must let the authorities know about the theft, and the authorities must update their database for the theft and mark a certificate as stolen. There is a lag between theft and revocation giving an opportunity to the hacker to perform an attack. The subject matter described herein mitigates the problem of deregistered NF certificates stolen without the owner's knowledge by automatically revoking certificates used for SBI communications on NF deregistration.

Figure 2:
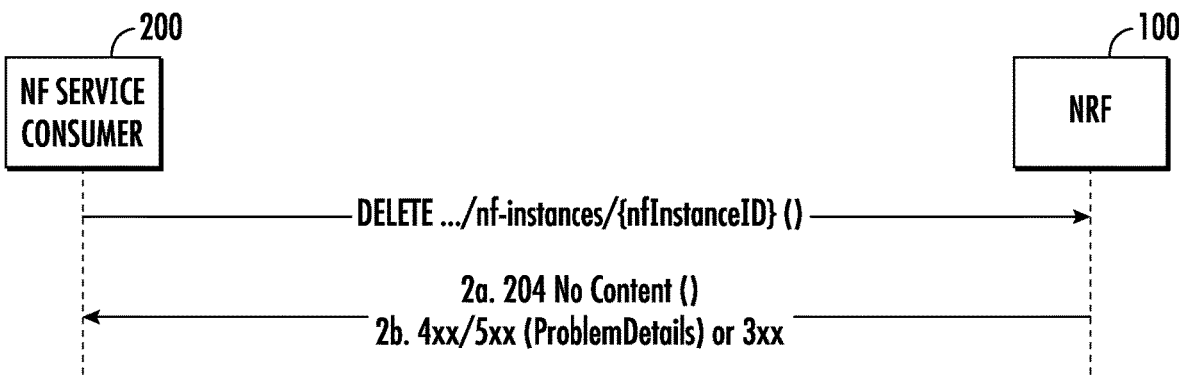
FIG. 2 is a message flow diagram illustrating exemplary messages exchanged in an NF deregister service operation.

FIG. 2 is a message flow diagram illustrating exemplary messages exchanged in an NF deregister service operation. The NF deregister service operation is a procedure by which an NF service consumer deregisters its NF profile previously registered with the NRF. When an NF service consumer deregisters with the NRF, the NF service consumer is indicating that the NF service consumer is decommissioning itself, and thus communications from that NF service consumer should not appear in the network. The subject matter described herein utilizes the NF deregister service operation to automatically trigger revocation of digital certificates of NF service consumers used for SBI communications.

The message flow in FIG. 2 is defined in 3GPP TS 29.510, section 5.2.2.4. Referring to the message flow in FIG. 2, in step 1, when an NF service consumer 200 seeks to deregister itself with NRF 100, NF service consumer 200 sends an NF deregister request to NRF 100. The NF deregister request is an HTTP DELETE request to the resource URI representing the NF instance being deregistered. NRF 100 receives the HTTP DELETE request, reads the NF instance ID from the request, locates the resource identified by the NF instance ID, and deletes the resource. In an NF deregister service operation the resource deleted is the NF profile corresponding to the NF instance ID. In response to successful completion of an NF deregister service operation, NRF 100 responds as indicated in step 2a with a 204 no content message. On failure of the NF deregister service operation or redirection of the NF deregister request to another NRF, NRF 100 responds as indicated in step 2b with a 4xx or 5xx message specifying problem details or a 3xx message indicating redirection.

After NF service consumer 200 has been successfully deregistered, there should be no further SBI communications from NF service consumer 200. However, if one or more digital certificates of NF service consumer 200 used for SBI communications are compromised, a hacker can use the digital certificates to impersonate NF service consumer 200 and gain unauthorized access to subscriber data.

Certificate revocation is a procedure defined in 3GPP standards for revoking certificates in which a certificate is deemed invalid before the end of its lifecycle, e.g., when a certificate is known to be compromised. A certificate authority (CA) maintains revoked certificate details. 3GPP TS 33.310, Appendix F.2 recommends using an online certificate security protocol (OCSP) or certificate revocation list (CRL) to validate the status of the TLS certificate presented by a peer entity (e.g., in a TLS handshake) by fetching the certificate status from the CA. Once a TLS certificate is marked as revoked by the CA, usage of such a certificate in the authentication and authorization (e.g., in a TLS handshake) procedures will lead to failures. CMPv2 supports a certificate revocation procedure as specified in RFC 4210, sections 5.3.9 and 5.3.10. The revocation request can include a revocation reason, as specified in RFC 5280. The following are the specified revocation reasons:

```
CRLReason ::= ENUMERATED {
    unspecified             (0),
    keyCompromise           (1),
    cACompromise            (2),
    affiliationChanged      (3),
    superseded              (4),
```

-continued

```
    cessationOfOperation    (5),
    certificateHold         (6),
    -- value 7 is not used
    removeFromCRL           (8),
    privilegeWithdrawn      (9),
    aACompromise            (10) }
```

According to an aspect of the subject matter described herein, when an NF's certificate is automatically revoked because of a deregistration event, the reason that may be used is cessationOfOperation (5).

3GPP recommends using separate certificates based on the client/server mode and type of workflow (operations, administration, and maintenance (OAM), signaling, etc.). This recommendation leads to multiple certificates, amounting to hundreds of certificates in the network. Automation of certificate management becomes important to avoid network disruption due to expired certificates.

3GPP 33,310 recommends CMPv2 for PKI automation. In line with cloud native principles and to keep 5G NFs light-weight, network operators prefer to support all certificate management functionality in a separate and centralized NF (such as a certificate manager NF or POD). The certificate manager acts as the CMP client and handles all of the certificate management for the integrated NFs. The certificate manager holds the relevant data (NF Instance ID, etc.) associated with the certificates being managed.

Figure 3:
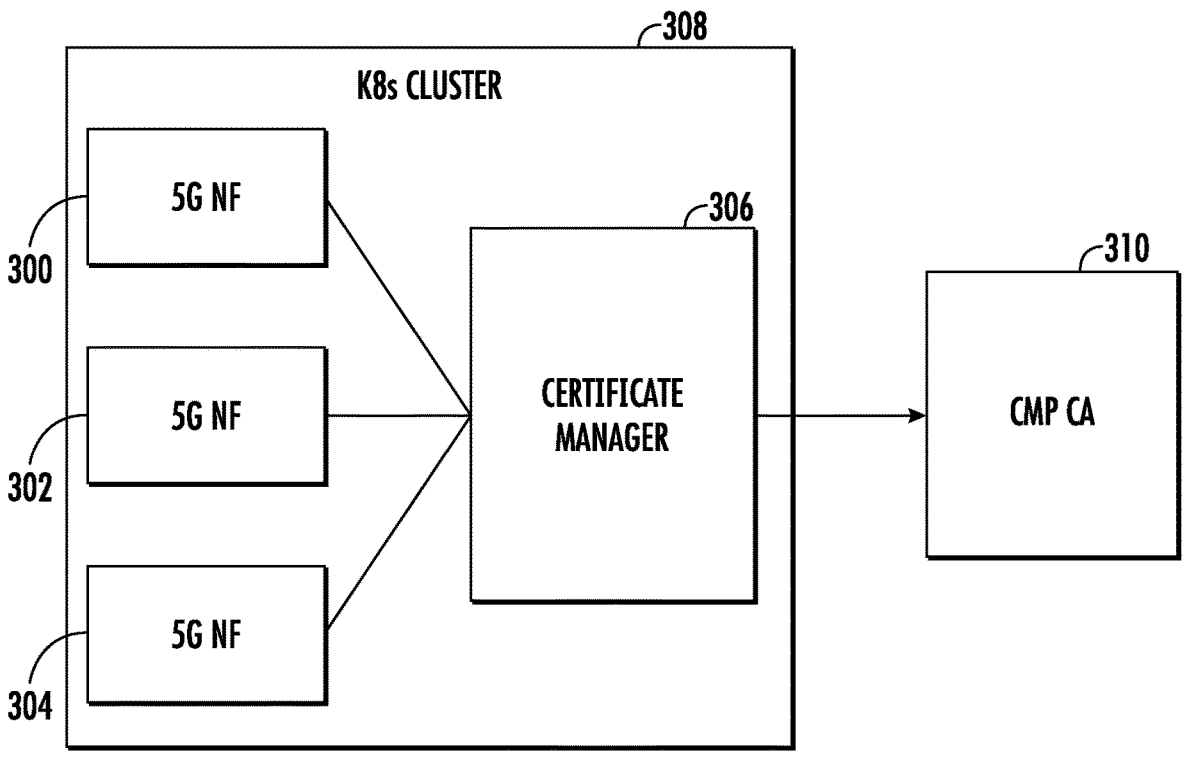
FIG. 3 is a network diagram illustrating exemplary components associated with public key infrastructure management through a certificate manager.

FIG. 3 is a network diagram illustrating exemplary components associated with public key infrastructure management through a certificate manager. Referring to FIG. 3, 5G NFs 300, 302, and 304 and certificate manager 306 all reside on kubernetes cluster 308. Certificate manager 306 handles certificate revocation on behalf of 5G NFs 300, 302, and 304 with a certificate authority 310. Certificate authority 310 functions as the certificate server for issuing and revoking certificates.

Figure 4:
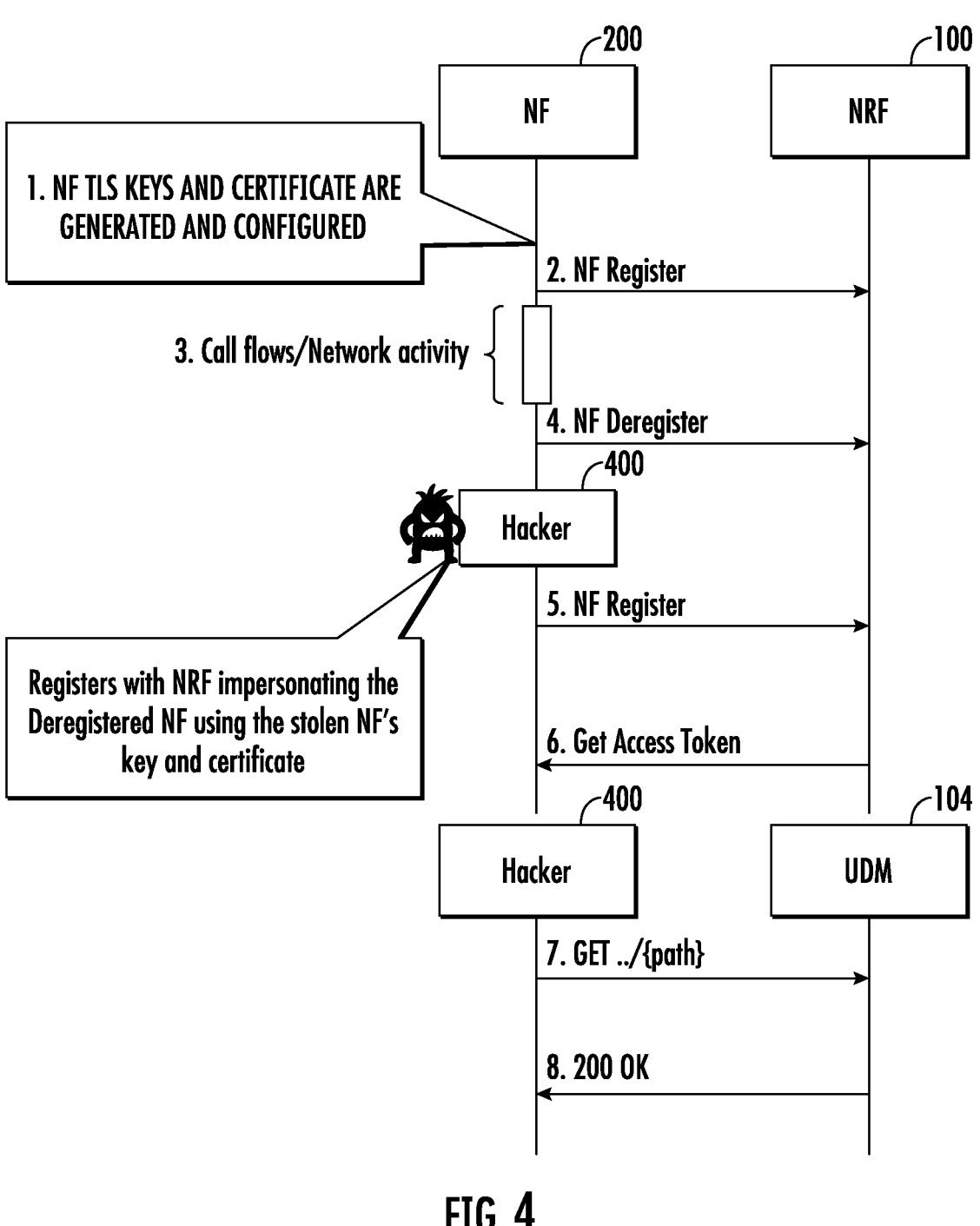
FIG. 4 is a message flow diagram illustrating exemplary messages exchanged when a hacker obtains an NF's security key and digital certificate and uses the key and certificate to access subscriber data without authorization.

FIG. 4 is a message flow diagram illustrating exemplary messages exchanged when a hacker obtains an NF's security key and digital certificate and uses the key and certificate to access subscriber data without authorization. Referring to FIG. 4, in step 1, NF TLS keys and a certificate are configured at NF 200. NF 200 uses the TLS keys and certificate to establish a TLS connection with NRF 100. Once a TLS connection is set up with NRF 100, in step 2, NF 200 sends an NF register request to NRF 100. NRF 100 responds to the NF register request indicating successful registration of NF 200. After successful registration of NF 200, in step 3, normal call flows involving NF 200 may occur.

In step 4, NF 200 sends an NF deregister request to NRF 100. NRF 100 receives the NF deregister request and deregisters NF 200 by deleting the NF profile of NF 200 from the NF profiles database. Although not shown in FIG. 4, NRF 100 sends an NF deregister response to NF 200 indicating successful deregistration of NF 200.

After step 4, communications from NF 200 should not appear in the network. However, in step 5, a hacker who has obtained the deregistered NF's TLS certificate and keys attempts a TLS handshake with NRF 100 as part of an NF register request to NRF 100 impersonating NF 200. Because there is no check to see if the certificate or keys are revoked or stolen, the TLS handshake is successful, and NRF 100 registers hacker 400 as NF 200 in its NF profiles database.

In step 6, hacker 400 obtains an Oauth 2.0 access token to access UDM 104. In step 7, hacker 400 uses the Oauth 2.0 access token to access subscriber data in UDM 104. In step 8, UDM 104 provides the requested subscriber data. Thus, FIG. 4 illustrates the case where an NF's key and certificate are used to obtain unauthorized access to subscriber data after an NF deregisters. There is no 3GPP-defined automated method that links a certificate's lifecycle with an NF's lifecycle.

Figure 5:
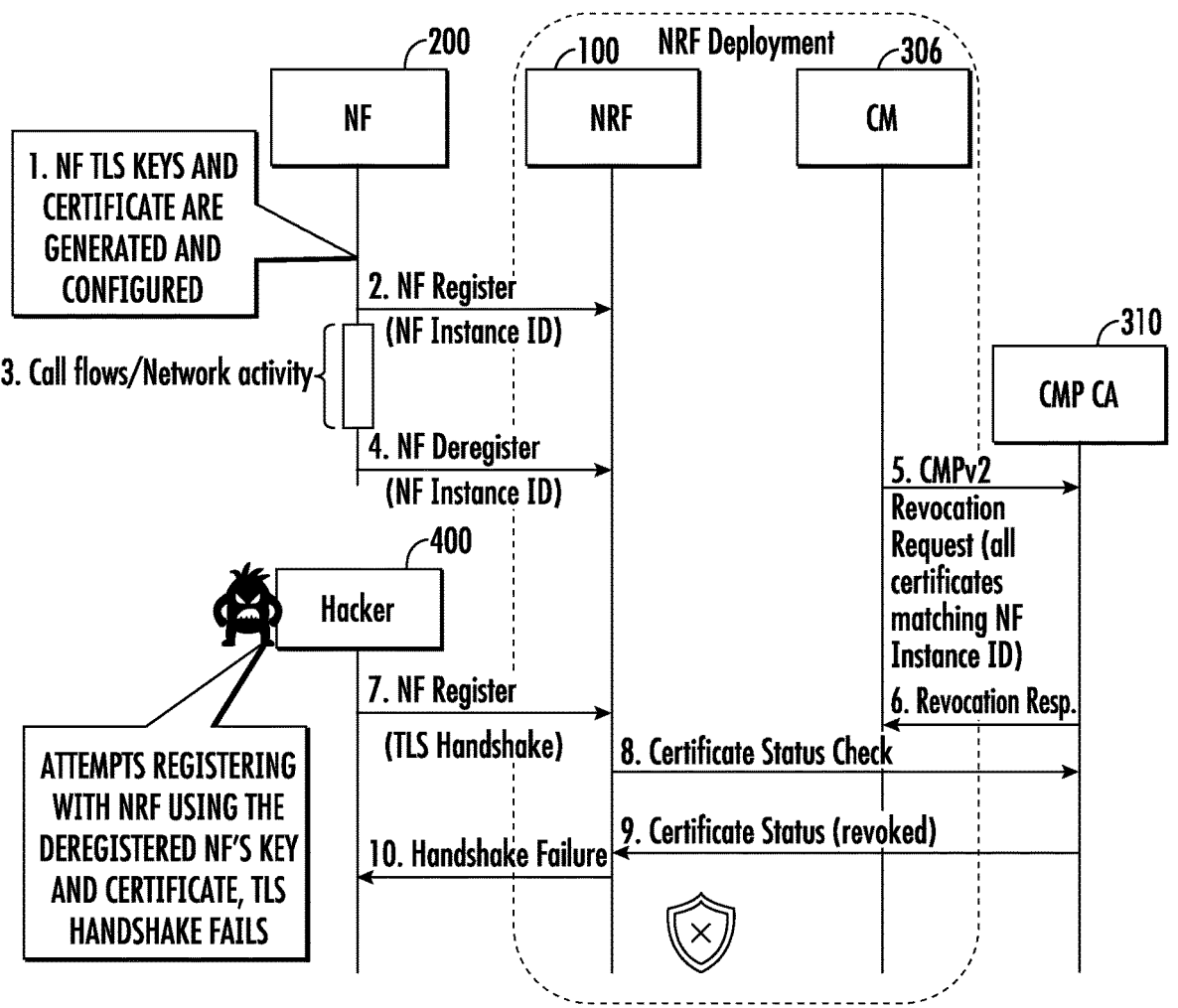
FIG. 5 is a message flow diagram illustrating exemplary messages exchanged when an NRF deployment includes a certificate manager that automatically binds a certificate's lifecycle to an NF's lifecycle.

FIG. 5 is a message flow diagram illustrating exemplary messages exchanged when an NRF deployment includes a certificate manager that automatically binds a certificate's lifecycle to an NF's lifecycle. Referring to FIG. 5, in step 1, NF TLS keys and certificates are generated and configured by NF 200. NF 200 uses the TLS keys and certificate to establish a TLS connection with NRF 100. Once a TLS connection is set up with NRF 100, in step 2, NF 200 sends an NF register request to NRF 100. NRF 100 responds to the NF register request indicating successful registration of NF 200. After successful registration of NF 200, in step 3, normal call flows involving NF 200 can occur.

In step 4, NF 200 sends an NF deregister request to NRF 100. NRF 100 receives the NF deregister request and deregisters NF 200 by deleting the NF profile of NF 200 from the NF profiles database.

In step 5, responsive to successful completion of the NF deregister service operation in step 4, certificate manager (CM) 306 of the NRF deployment sends a certificate management protocol revocation request to certificate authority 310. The certificate management protocol registration request includes a request to revoke all digital certificates used for SBI communications matching the NF instance ID of the NF instance that deregistered in step 4. CA 310 receives the revocation request, uses the NF instance ID in the revocation request to locate all digital certificates used for SBI communications corresponding to the NF instance ID, and revokes all of the located digital certificates corresponding to the NF instance ID. In step 6, CA 310 sends a certificate revocation response to CM 306 confirming that the digital certifications corresponding to the NF instance ID have been revoked.

In one example, the certificate revocation request may include copies of the digital certificates whose revocation is being requested, and the NF instance ID of the NF to which the certificate was issued may be embedded in each certificate.

In step 7, a hacker who has obtained the deregistered NF's TLS certificate and keys attempts a TLS handshake with NRF 100 as part of an NF register request with NRF 100 impersonating NF 200. In step 8, in response to the NF register request, NRF 100 sends a certificate status check request to CA 310. CA 310 responds in step 9 indicating that the certificate used by the hacker for the TLS handshake has been revoked. It should be noted that the certificate status check could be performed internally by NRF 100 if NRF 100 maintains a copy or list of certificates that have been revoked. In step 10, NRF 100 responds to hacker 400 with a TLS handshake failure, preventing hacker 400 from obtaining unauthorized access to network resources.

While FIG. 5 illustrates the case where a TLS certificate of an NF is automatically revoked in response to NF deregistration, the subject matter described herein is not limited to revoking TLS certificates in response to NF deregistration. For example, certificates or other credentials used for OAuth 2.0 and CCA transactions may also be revoked in response to NF deregistration. For example, the NRF may automatically revoke an OAuth 2.0 access token issued to an NF in response to deregistration of the NF. In another example, the NRF may automatically revoke the X.509 certificate used by an NF service consumer to sign a client credentials assertion.

Figure 6:
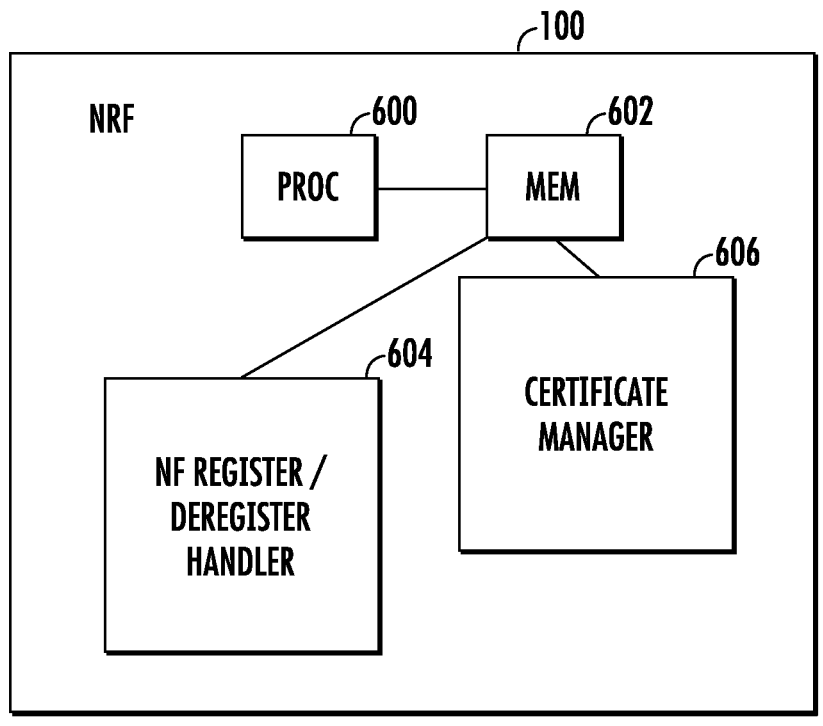
FIG. 6 is a block diagram illustrating an exemplary architecture for an NRF that automatically binds a certificate's life cycle to an NF's lifecycle.

FIG. 6 is a block diagram illustrating an exemplary architecture for an NRF that automatically binds a certificate's life cycle to an NF's lifecycle. Referring to FIG. 6, NRF 100 includes at least one processor 600 and memory 602. NRF 100 further includes an NF register/deregister handler 604 that handles NF register and NF deregister requests according to 3GPP TS 29.510. NRF 100 further includes certificate manager 306 that automatically revokes digital certificates of deregistered NFs and that performs certificate status checks as illustrated in FIG. 5. NF register/deregister handler 604 and certificate manager 306 may be implemented using computer executable instructions stored in memory 602 and executed by processor 600.

FIG. 7 is a flow chart illustrating an exemplary process for automatically binding the lifecycle of a digital certificate for SBI communications to an NF's lifecycle. Referring to FIG. 7, in step 700, the process includes receiving, at an NRF, an NF deregister request for deregistering an NF. For example, NRF 100 may receive an NF deregister request from an NF, including any of the NF types illustrated in FIG. 1, for deregistering the NF. The NF deregister request includes an NF instance ID of the NF requesting deregistration.

In step 702, the process further includes generating, by the NRF and in response to the NF deregister request message or successful completion of deregistration of the NF, a certificate revocation request message for revoking at least one digital certificate used by NF for SBI communications. For example, NRF 100 may generate a certificate revocation request message for revoking all digital certificates of an NF used for SBI communications. The certificate revocation request may be a certificate management protocol (CMP) request message and may include the NF instance ID of the NF that sent the NF deregister request.

In step 704, the process further includes transmitting, by the NRF, the certificate revocation request message to a certificate authority. For example, NRF 100 may transmit the certificate revocation request message to a certificate authority, such as CMP CA 310 illustrated in FIG. 5. The certificate revocation request may request revocation of any digital certificates used by the NF for SBI communications.

In step 706, the process further includes receiving, by the NRF, an NF register request message identifying the NF. For example, NRF 100 may receive an NF register request message that includes the NF instance ID of an NF that has previously been deregistered.

In step 708, the process further includes determining, by the NRF, that the at least one digital certificate of the NF has been revoked. For example, NRF 100 may query CA 310 to determine whether one or more digital certificates of the NF identified in an NF register request have been revoked.

In step 710, the process further includes, in response to determining that the at least one digital certificate of the NF has been revoked, performing, by the NRF, a network security action in response to the NF register request message. For example, NRF 100 may reject the NF register request message by transmitting a handshake failure message to an NF or a hacker seeking to register an NF instance ID of an NF whose digital certificates were revoked in response to an NF deregister request.

Exemplary advantages of the subject matter described herein include increased network security by tying the lifecycle of an NF's keys and certificates to the lifecycle of the NF. As a result, the likelihood of unauthorized access to subscriber data is reduced. The subject matter described herein is applicable to any certificate used for SBI communications, including X.509 certificates and any other certificates used for TLS, OAuth 2.0, and CCA transactions.

The disclosure of each of the following references is hereby incorporated herein by reference in its entirety.

REFERENCES 1. 3$^{rd}$ Generation Partnership Project; Technical Specification Group Core Network and Terminals; 5G System; Network Function Repository Services; Stage 3 (Release 18) 3GPP TS 29.510 V18.1.0 (2022-12)

2. 3$^{rd}$ Generation Partnership Project; Technical Specification Group Services and System Aspects; Network Domain Security (NDS); Authentication Framework (AF) (Release 18) 3GPP TS 33.310 V18.0.0 (2023-03)

3. Cooper, et al., "Internet X.509 Public Key Infrastructure Certificate and Certificate Revocation List (CRL) Profile", IETF RFC 5280 (May 2008)

4. Adams, et al., "Internet X.509 Public Key Infrastructure Certificate Management Protocol (CMP)", IETF RFC 4210 (September 2005)

5. 3$^{rd}$ Generation Partnership Project; Technical Specification Group Services and System Aspects; Security architecture and procedures for 5G system (Release 18) 3GPP TS 33.501 V18.0.0 (2022-12)

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for automatically binding a service-based interface (SBI) communications digital certificate lifecycle to a network function (NF) lifecycle, the method comprising:

receiving, at an NF repository function (NRF), an NF deregister request message generated by an NF for deregistering the NF, wherein the NF is a 5G NF and the NF deregister request message is transmitted by the 5G NF for the 5G NF to indicate to the NRF that the 5G NF is decommissioning itself and that communications from the 5G NF should not appear in a 5G network;

generating, by the NRF and automatically in response to the NF deregister request message generated by the 5G NF or successful completion of deregistration of the 5G NF in response to the NF deregister request message generated by the 5G NF, a certificate revocation request message for revoking at least one digital certificate used by the 5G NF for SBI communications;

transmitting, by the NRF, the certificate revocation request message to a certificate authority;

receiving, by the NRF, an NF register request message identifying the 5G NF;

determining, by the NRF, that the at least one digital certificate of the 5G NF has been revoked; and in response to determining that the at least one digital certificate of the NF has been revoked, performing, by the NRF, a network security action in response to the NF register request message, wherein performing the network security action includes rejecting the NF register request message.

2. The method of claim 1 wherein generating the certificate revocation request message includes generating a request message for revoking a digital certificate corresponding to an NF instance ID of the NF.

3. The method of claim 2 wherein generating the certificate revocation request includes embedding the NF instance ID in the digital certificate and including the digital certificate in the certificate revocation request message.

4. The method of claim 1 wherein generating the certificate revocation request message includes generating a certificate management protocol (CMP) certificate revocation request message.

5. The method of claim 1 wherein generating the certificate revocation request message includes generating the certificate revocation request message for revoking at least a transport layer security (TLS) certificate used by the NF for SBI communications.

6. The method of claim 1 wherein generating the certificate revocation request message includes generating the certificate revocation request message for revoking at least an OAuth 2.0 certificate used by the NF for SBI communications.

7. The method of claim 1 wherein generating the certificate revocation request message includes generating the certificate revocation request message for revoking at least a client credentials assertion (CCA) certificate used by the NF for SBI communications.

8. The method of claim 1 wherein determining that the at least one digital certificate has been revoked includes querying, by the NRF, the certificate authority to determine status of the at least one digital certificate.

9. The method of claim 1 comprising receiving, by the certificate authority, the certificate revocation request message and revoking the at least one digital certificate of the NF.

10. A system for automatically binding a service-based interface (SBI) communications digital certificate lifecycle to a network function (NF) lifecycle, the system comprising:

an NF repository function (NRF) including at least one processor and a memory;

an NF register/deregister handler implemented by the at least one processor for receiving an NF deregister request message generated by an NF for deregistering the NF, wherein the NF is a 5G NF and the NF deregister request message is transmitted by the 5G NF for the 5G NF to indicate to the NRF that the 5G NF is decommissioning itself and that communications from the 5G NF should not appear in a 5G network;

a certificate manager implemented by the at least one processor for generating, automatically in response to the NF deregister request message generated by the NF or successful completion of deregistration of the 5G NF in response to the NF deregister request message generated by the 5G NF, a certificate revocation request message for revoking at least one digital certificate used by the 5G NF for service-based interface (SBI) communications and transmitting, by the NRF, the certificate revocation request message to a certificate authority;

wherein the NF register/deregister handler is configured to receive an NF register request message identifying the 5G NF;

wherein the certificate manager is configured to determine that the at least digital one certificate of the 5G NF has been revoked; and wherein the NF register/deregister handler is configured to, in response to the determination that that the at least one digital certificate of the 5G NF has been revoked, perform a network security action in response to the NF register request message, wherein performing the network security action includes rejecting the NF register request message.

11. The system of claim 10 wherein the certificate revocation request message includes an NF instance ID of the NF for revoking a digital certificate corresponding to the NF instance ID of the NF.

12. The system of claim 11 wherein the NF instance ID is embedded in the digital certificate, which is included in the certificate revocation request message.

13. The system of claim 10 wherein the certificate revocation request message includes a certificate management protocol (CMP) certificate revocation request message.

14. The system of claim 10 wherein the certificate revocation request message includes a request message for revoking at least a transport layer security (TLS) certificate used by the NF for SBI communications.

15. The system of claim 10 wherein the certificate revocation request message includes a request message for revoking at least an OAuth 2.0 certificate used by the NF for SBI communications.

16. The system of claim 10 wherein the certificate revocation request message includes a request message for revoking at least a client credentials assertion (CCA) certificate used by the NF for SBI communications.

17. The system of claim 10 wherein in determining that the at least one digital certificate has been revoked, the certificate manager is configured to query the certificate authority to determine the status of the at least one digital certificate.

18. A non-transitory computer readable medium having stored thereon executable instructions that when executed by a processor of a computer control the computer to perform steps comprising:

receiving, at a network function (NF) repository function (NRF), an NF deregister request message generated by an NF for deregistering the NF, wherein the NF is a 5G NF and the NF deregister request message is transmitted by the 5G NF for the 5G NF to indicate to the NRF that the 5G NF is decommissioning itself and that communications from the 5G NF should not appear in a 5G network;

generating, by the NRF and automatically in response to the NF deregister request message generated by the 5G NF or successful completion of deregistration of the 5G NF in response to the NF deregister request message generated by the 5G NF, a certificate revocation request message for revoking at least one digital certificate used by the 5G NF for service-based interface (SBI) communications;

transmitting, by the NRF, the certificate revocation request message to a certificate authority;

receiving, by the NRF, an NF register request message identifying the NF;

determining, by the NRF, that the at least one digital certificate of the 5G NF has been revoked; and in response to determining that the at least one digital certificate of the 5G NF has been revoked, performing, by the NRF, a network security action in response to the NF register request message, wherein performing the network security action includes rejecting the NF register request message.

* * * * *